US006778987B1

(12) United States Patent
Wynblatt et al.

(10) Patent No.: US 6,778,987 B1
(45) Date of Patent: Aug. 17, 2004

(54) SYSTEM AND METHODS FOR HIGHLY DISTRIBUTED WIDE-AREA DATA MANAGEMENT OF A NETWORK OF DATA SOURCES THROUGH A DATABASE INTERFACE

(75) Inventors: Michael Wynblatt, Pleasant Hill, CA (US); Julio C. Navas, Walnut Creek, CA (US); Karl-Heinz Maier, Nuremburg (DE)

(73) Assignee: Centerboard, Inc., Pleasanton, CA (US)

( * ) Notice: Subject to any disclaimer, the term of this patent is extended or adjusted under 35 U.S.C. 154(b) by 596 days.

(21) Appl. No.: 09/726,702

(22) Filed: Nov. 28, 2000

Related U.S. Application Data
(60) Provisional application No. 60/168,425, filed on Nov. 30, 1999, and provisional application No. 60/168,426, filed on Nov. 30, 1999.

(51) Int. Cl.[7] .............................................. G06F 2/30
(52) U.S. Cl. ........................................................ 707/10
(58) Field of Search ......................................... 707/3, 10

(56) References Cited

U.S. PATENT DOCUMENTS

| | | | | |
|---|---|---|---|---|
| 4,635,189 A | | 1/1987 | Kendall ....................... 364/200 |
| 4,769,772 A | | 9/1988 | Dwyer ......................... 364/300 |
| 5,093,782 A | | 3/1992 | Muraski et al. ............. 395/600 |
| 5,179,660 A | | 1/1993 | Devany et al. .............. 395/200 |
| 5,301,339 A | | 4/1994 | Boasson ....................... 395/800 |
| 5,459,860 A | | 10/1995 | Burnett et al. .............. 395/600 |
| 5,581,749 A | | 12/1996 | Hossain et al. ............. 395/600 |
| 5,596,744 A | * | 1/1997 | Dao et al. ....................... 707/10 |
| 5,606,693 A | | 2/1997 | Nilsen et al. ................ 395/610 |
| 5,721,909 A | | 2/1998 | Oulid-Aissa et al. ....... 395/610 |
| 5,740,423 A | * | 4/1998 | Logan et al. ................... 707/10 |
| 5,805,442 A | | 9/1998 | Crater et al. ................ 364/138 |
| 5,835,757 A | | 11/1998 | Oulid-Aissa et al. ....... 395/610 |
| 5,864,842 A | * | 1/1999 | Pederson et al. .............. 707/3 |
| 5,884,299 A | * | 3/1999 | Ramesh et al. ................. 707/2 |

OTHER PUBLICATIONS

Wycoff et al., "T Spaces" *IBM Systems Journal*, Aug. 1998, pp. 454–474.

Sun Microsystems "JavaSpaces™ Services Specification," Version 1.1 Beta, May 2000, pp. 1–24.

Navas et al., "Jambalaya: Using Multicast for Blind Distributed Web Searching and Advertising," Technical Report (LCSR–TR–377), Rutgers University Computer Science, Nov. 30, 1998, pp. 1–15.

Bonnet et al., "Query Processing in a Device Database System," Cornell Technical Report TR99–1775, Oct. 1999, pp. 1–26.

Kahn et al., "Emerging Challenges: Mobile Networking for 'Smart Dust'," *Journal of Communication and Networks*, Sep. 2000, vol. 2, No. 3, pp. 188–196.

(List continued on next page.)

*Primary Examiner*—Jack Choules
(74) *Attorney, Agent, or Firm*—Glenn Patent Group; Michael A. Glenn

(57) ABSTRACT

Methods and a system that provide a network of data sources in terms of a traditional database schema, convert traditional database queries into network messages, and route those messages to those data sources which have relevant data. In the present invention, the network interface of the data source accepts the message, filters the data source's output according to the instructions in the message, and then sends reply messages to the originator of the query. The system then collects these reply messages at the query originator and produces query results as a traditional database result.

42 Claims, 5 Drawing Sheets

OTHER PUBLICATIONS

Kahn et al., "Next Century Challenges: Mobile Networking for 'Smart Dust'," *Proc. of ACM/IEEE Intl. Conf. on Mobile Computing and Networking* (MobiCom '99), Seattle, WA, Aug. 17–19, 1999.

Bonnet et al., "Querying the Physical World," *IEEE Personal Communications, Special Issue on Smart Spaces and Environments*, Oct. 2000.

Mayr et al., "Query Processing with Heterogeneous Resources," Technical Report TR00–1790, Cornell University, Computer Science Department, Ithaca, NY, Mar. 2000, pp. 1–21.

Julio C. Navas and Tomasz Imielinski, GeoCast—Geographic Addressing and Routing, ACM MobiCom, Aug. 1999.

Pavlin Ivanov Radoslavov, Deborah Estrin, Ramesh Govindan, Exploiting the Bandwidth–Memory Tradeoff in Multicast State Aggregation, University of Southern California, Department of Computer Science Information Sciences Institute, Jul. 1, 1999, USC Dept. of Computer Science Technical Report 99–697 (Second Revision).

David Gelernter, Generative Communication in Linda, ACM Transactions on Programming Languages and Systems, vol. 7, No. 1, Jan. 1985, pp. 80–112.

Haym Hirsch, Chumki Basu, and Brain D. Davision, Learning to Personalize, Recognizing Patterns of Behavior Helps Systems Predict Your Next Move, Aug. 2000,vol. 43, No. 8, Communications of the ACM, pp. 103–106.

Bonnet, et al., "Towards Sensor Database Systems", $2^{nd}$ International Conference on Mobile Data Management, Hong Kong, Jan. 2001.

Borland, "Napster–like Technology Take Web Search to New Level", www.cnet.com, May 31, 2000.

Chung, "Design and Implementation of a Heterogeneous Distributed Database Management", Infocom 1989, Proceedings of the $8^{th}$ Annual Joint Conference of the IEEE Computer and Communications Societies. Technology: Emerging or Converging, IEEE Ottawa, Ont., Canada 23–27, Apr. 1989, Washington, DC., USA, IEEE Comput. Soc. PR, US, Apr. 23, 1989, pp. 356–362.

Deering, "Multicast Routing in a Datagram Internetwork", Stanford Technical Report, STAN–CS–92–1415, Department of Computer Science, Stanford University, Dec. 1991.

Estrin, et al., "Next Century Challenges: Scalable Coordination in Sensor Networks", ACM MobiCom 99, Aug. 99, Seattle USA.

JavaSpaces™ Service Specification, Version 1.1, Sun Microsystems, Oct. 2000.

Lehman, et al., "T Spaces: The Next Wave", Hawaii Int'l Conf. On System Science, 1999.

Liu, "Query Routing in Large–scale Digital Library Systems", Data Engineering, 1999. Proceedings, $15^{th}$ International conference on Sydney, NSW, Australia, Mar. 23–26, 1999, Los Alamitos, CA, USA, IEEE Comput, Soc., US, Mar. 23, 1999, pp 154–163.

Computer Science Department; Rutgers, The State University, Nov. 1998.

Navas, et al., "On Reducing the Computational Cost of Geographical Routing" Technical Report (DCS–TR–408), Rutgers University Computer Science, Jan. 24, 2000.

Qian, et al., "Query Interpolation Among Object–Oriented and Relational Databases", Data Engineering, 1995. Proceedings of the $11^{th}$ International Conference on Taipei, Taiwan Mar. 6–10, 1995, Los Alamitos, CA, USA, IEEE Comput. Soc., Mar. 6, 1995.

Stonebraker, et al., "Mariposa: A Wide–area Distributed Database System" The VLDB Journal , Springer–Verlag Publisher, pp. 48–63, 1996.

The Network Simulator—ns2 http://www.isi.edu/nsnam/ns.

Zhao, et al., "A Universal Relation Approach to Federated Database Management", Data Engineering, 1995. Proceedings of the $11^{th}$ International Conference on Taipei, Taiwan Mar. 6–10, 1995, Los Alamitos, CA, USA, IEEE Comput. Soc. (Mar. 6, 1995), pp. 261–270.

* cited by examiner

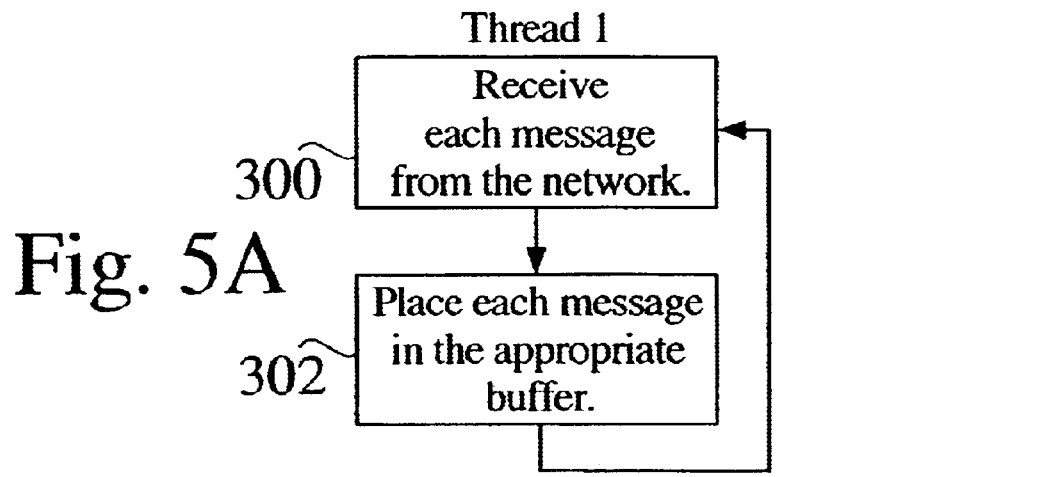
Fig. 5A
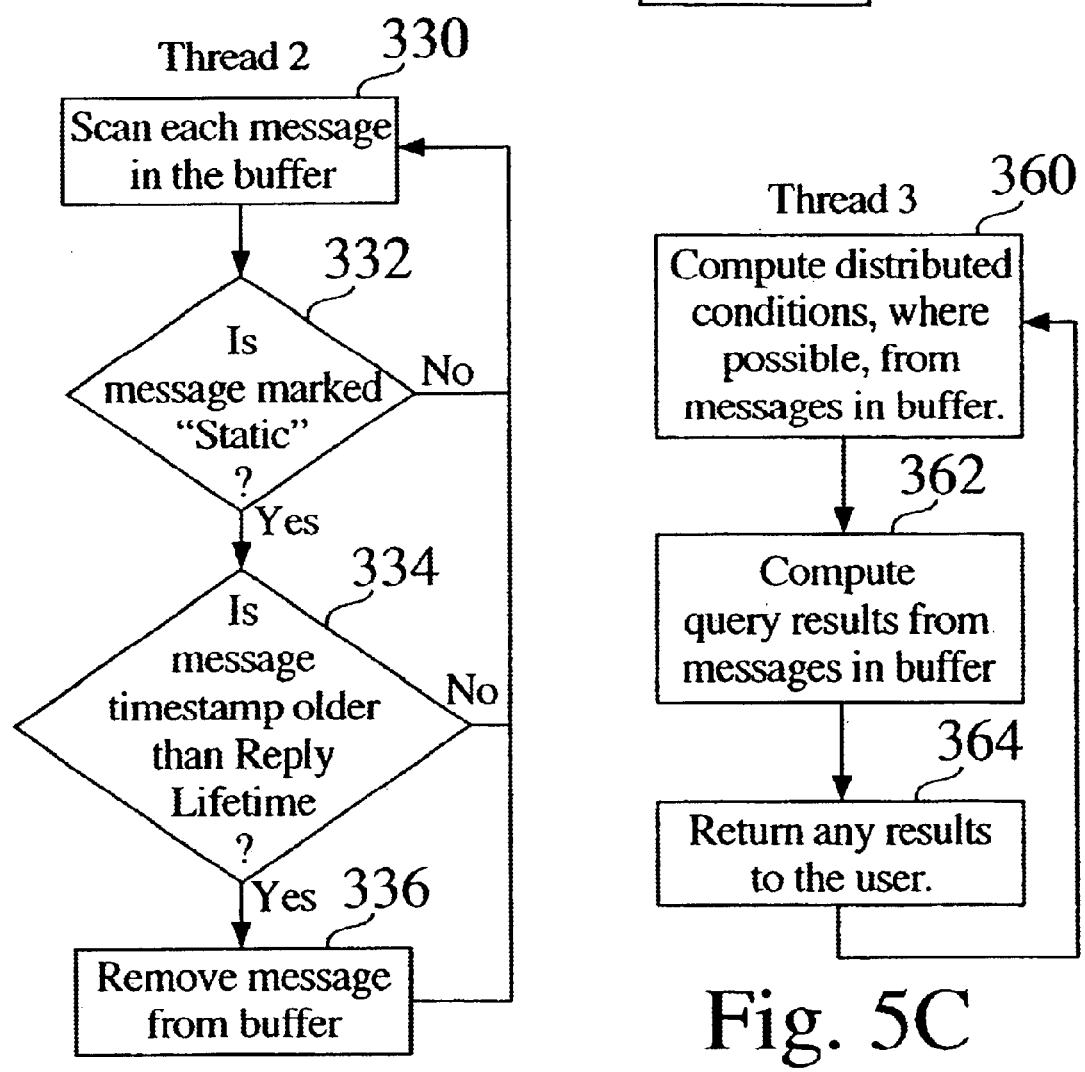
Fig. 5B
Fig. 5C

SYSTEM AND METHODS FOR HIGHLY DISTRIBUTED WIDE-AREA DATA MANAGEMENT OF A NETWORK OF DATA SOURCES THROUGH A DATABASE INTERFACE

CROSS-REFERENCE TO RELATED APPLICATIONS

This application claims priority from commonly-owned provisional U.S. patent application No. 60/168,425 entitled "A System for Communicating with a Network of Sensors Through a Database Interface" and Ser. No. 60/168,426 entitled "Characteristic Routing," both filed on Nov. 30, 1999. This application is also related to commonly-owned U.S. patent application No. 39/728,380 filed concurrently and entitled "Characteristic Routing" and listing inventor Julio C. Navas.

BACKGROUND OF THE INVENTION

A trend in the information, communication, and automation industries is for increasingly distributed solutions. Recent examples of this trend are the proposal for networked sensors and the suggestion that large groups of such data sources could form large distributed information systems called "networks of data sources." In the article "Next Century Challenges: Mobile Networking for Smart Dust" (published in MobiComm 1999), authors Kahn et al. discuss an example of a distributed network of data sources in the form of a network of sensors.

The primary idea of a network of data sources is that individual data sources, or perhaps small groups of data sources, would be connected to computer networks, using standard communications protocols, such as the Internet Protocol (IP). Other devices on the network would then be able to access the data provided by the data sources, either individually or in aggregate depending on the application. In the most ambitious proposals, wireless networks of data sources define their topologies dynamically as they are deployed, and continuously redefine their links and routing schemes to account for new and failing nodes and optimal power management. Rudimentary forms of networks of data sources are already being used in some industrial process control systems, and future applications for networks of data sources are widely predicted in many domains.

One difficulty in the current art regarding networks of data sources is how to manage data from the data sources. This can be contrasted with the current art in the world of information technology (IT), in which data management techniques are rich. In the IT world, techniques such as data aggregation, type-based data access, query optimization, transaction management, data filtering, data mining, and many others are well established tools. Thus, for data that is resident in memory, on disk, or in well-structured distributed databases, data management is a well-understood art. However, networks of data sources present difficulties for data management, as the data sent by a potential multitude of data sources can be overwhelming to the network or data management system used. Moreover, it is likely that data sources in the network continually provide information that will change or be updated frequently.

Prototype networks of data sources use protocols from the computer network world, based on TCP and UDP, which have been developed for communication rather than data management. Industrial systems use different but similar protocols such as Modbus. These protocols offer mechanisms to deliver messages in a point-to-point manner or to broadcast messages to all members of a network. However, these protocols often can be inadequate and have limited value in providing efficient data management in the network of data sources world. Accordingly, these types of systems developed for communication are problematic in that more complicated, extensive computer programs and systems used for data management in networks of data sources must often be created from scratch by programmers and system managers in order to implement more sophisticated data management techniques that have been available in IT technologies but by-and-large have not been available for networks of data sources.

One approach to limited data management, such as described for the field of industrial process control in U.S. Pat. No. 5,301,339 issued to Boasson, is to provide a system for communication among subsystems in which requests are fulfilled based on the type of the data. In such systems, although data of a certain type may be requested, there is no mechanism for constraining the desired values of the requested data. Such a mechanism is critical to implement traditional database queries such as, for example, asking for all temperature sensors reading temperatures higher than 100 degrees F. The system described by Boasson lacks any database view of the data to the data processing subsystems, any relational or object schema describing the data, and any facility to request data in traditional query language. Thus, the system of Boasson provides only limited data management capabilities far below the capabilities of traditional databases.

Another approach to data management, such as the real-time communication system for industrial processes that is described in U.S. Pat. No. 5,093,782 issued to Muraski et al., is one in which applications view remote data sources as parts of a database.

In these types of systems, subsystems that access and use remote data sources, such as controllers, maintain a database of these remote values. The systems are primarily concerned with updating these databases. One drawback of these schemes is that each controller must maintain its own database, which must have predefined references to each data source. For each subsystem that needs to access data, the address of all relevant data sources must be hard-coded. The database can also be a centralized failure point. A further drawback of these systems is that data must be continuously polled from data sources to maintain the correctness of the local database. This continuous polling from various data sources puts a heavy traffic burden on the network.

Although some potentially useful techniques to add richer data management tools to networks of data sources can be found in the distributed database community, the conventional work in distributed databases has been inadequate or incomplete for use with networks of data sources.

Some of this distributed database work has been designed to allow the structured contents of databases to spread over a computer network, and then be accessed as a single database. Unfortunately, the bulk of this work, such that described in the textbook "Principles of Distributed Database Systems," (M. Ozsu, P. Valduriez, Prentice-Hall, Inc., Upper Saddle River, N.J., 1999), incorporated herein by reference, has concentrated on the problems associated with dividing up a known database (called database fragmentation) in such a way as to optimize later accesses to this data. These techniques are not particular useful in the network of data sources world, because each data source provides only the data that it produces and thus there is no possibility to choose how the data is to be fragmented.

Another distributed database approach, such as described in U.S. Pat. No. 4,635,189 issued to Kendall and in U.S. Pat. No. 5,179,660 issued to Devany et al., provides mechanisms for dividing traditional database queries among distributed databases to which the data has not been carefully fragmented ahead of time. However, these types of systems are not suitable for networks of data sources for several reasons. First, because this approach pertains to more traditional distributed databases, it is simply assumed that the network location of any particular piece of data is known ahead of time. Such an assumption does not hold in many dynamic applications of networks of data sources, in which the data sources may be added at any time. For example, consider a network of data sources, formed by multiple automobiles each equipped with a data source and a wireless link, that is used for traffic monitoring. If a new automobile having a data source enters the highway and thus joins the network, the data that it provides desirably should be included in the query results, but the conventional systems of Kendall and Devany et al. do not provide a mechanism to dynamically account in the query results for data inputs from data sources added to the network of data sources. Second, the systems of Kendall and Devany et al. assume that significant processing capabilities are resident at each network node. This assumption does not hold for many networks of data sources, where a data source, analog-digital converter and network interface may constitute the entire network node. A similar approach is taken by Bonnet et al. (see P. Bonnet, J. Gehrke, T. Mayr, P. Seshadri, "Query Processing in a Device Database System," Cornell Technical Report TR99-1775, October 1999), who attempt to address networks of data sources specifically, but whose approach has the same limitations.

Accordingly, it is seen that a system and methods for providing more efficient, sophisticated query capabilities or techniques are desirable for useful data management of networks of data sources. Further, it is desirable to have a more economic way of providing a network of data sources system with data management that does requires neither each network node to have high processing capability nor the implementation of complicated programming in order to achieve data management techniques found in traditional database query languages. It is also desirable that such a system for networks of data sources be capable of richer data queries and communication without placing a heavy traffic burden on the network.

SUMMARY OF THE INVENTION

The above discussed problems and disadvantages are overcome by the present invention. The present invention allows traditional information technology data management techniques to be applied directly within networks of data sources. More specifically, the present invention allows a program, running on a device logically connected to a network which also logically connects the networked data sources, to issue a traditional database query onto the network and to receive back from the network the result of that query as it applies to the data produced by those data sources.

According to a specific embodiment, the invention provides a method for information management of a distributed data sources network database that includes multiple nodes. The nodes include a querying node and multiple data sources. The method includes steps of providing a schema for the distributed data sources network database, entering a query in a database language at the querying node in the network, decomposing the query into at least one network message, and transmitting the network message only to data sources relevant to the query. The method further includes steps of receiving the network message at the data sources relevant to the query, sending a reply message to the network message when the query is met, and providing a query result in the database language at the querying node from the reply message.

According to another specific embodiment, the present invention provides a system for information management of a distributed data sources network database. The system includes a network, multiple data sources coupled to the network, and at least one querying node coupled to the network. The data sources are capable of providing information according to a schema for the distributed data sources network database. The lo querying node is capable of receiving a query in a database language and decomposing the query into at least one network message that is transmitted over the network only to data sources relevant to the query. The data sources relevant to the query send a reply message over the network in response to the network message when the query is met, and the querying node provides a query result in the database language from the reply message.

These and other specific embodiments of the present invention and the features and advantages of the invention will be described in more detail below with reference to the accompanying drawings.

BRIEF DESCRIPTION OF THE DRAWINGS

FIGS. 5A–5C show functional descriptions for collecting network messages and interpreting query results, in accordance with specific embodiments of the invention.

DETAILED DESCRIPTION OF SPECIFIC EMBODIMENTS

According to a specific embodiment, the present invention includes a system that describes a network of data sources in terms of a traditional database schema, converts traditional database queries into network messages, and routes those messages to those data sources which have relevant data. In the present invention, the network interface of the data source accepts the message, filters the data source's output according to the instructions in the message, and then sends reply messages to the originator of the query. The system then collects these reply messages at the query originator and produces query results as a traditional database.

The present invention provides a system and methods which allow a network of data sources to be managed by multiple distributed clients as if the network of data sources were a single database. More specifically, the invention allows a program running on a networked device to issue a database query to its network interface, and for the network infrastructure to calculate the results of the query and return these results to the querying device. Specific embodiments of the present invention will be useful for information management in many different applications. A specific application is in industrial automation such as factory equipment control and management, as described below for exemplary purposes. However, other specific embodiments will be useful for logistics management such as for package delivery services, crisis management for toxin tracking or fire tracking, highway traffic management, security management for smart building or smart battlefield applications, and many other applications.

As will be discussed in more detail below, some of the advantages offered by this invention include: allowing users or programs to access and process data from networked data sources according to well known information technology standards, such as Structured Query Language (SQL); allowing multiple users and programs to access and process data source data from any point in the network; significantly reducing network traffic compared to polling or continuous-refresh systems; having no central point of failure for data access; having minimal latency, as data always travels the direct path from the data source to the requesting node; and not being necessary for the querying node to know the physical locations of the responding data sources.

Figure 1:
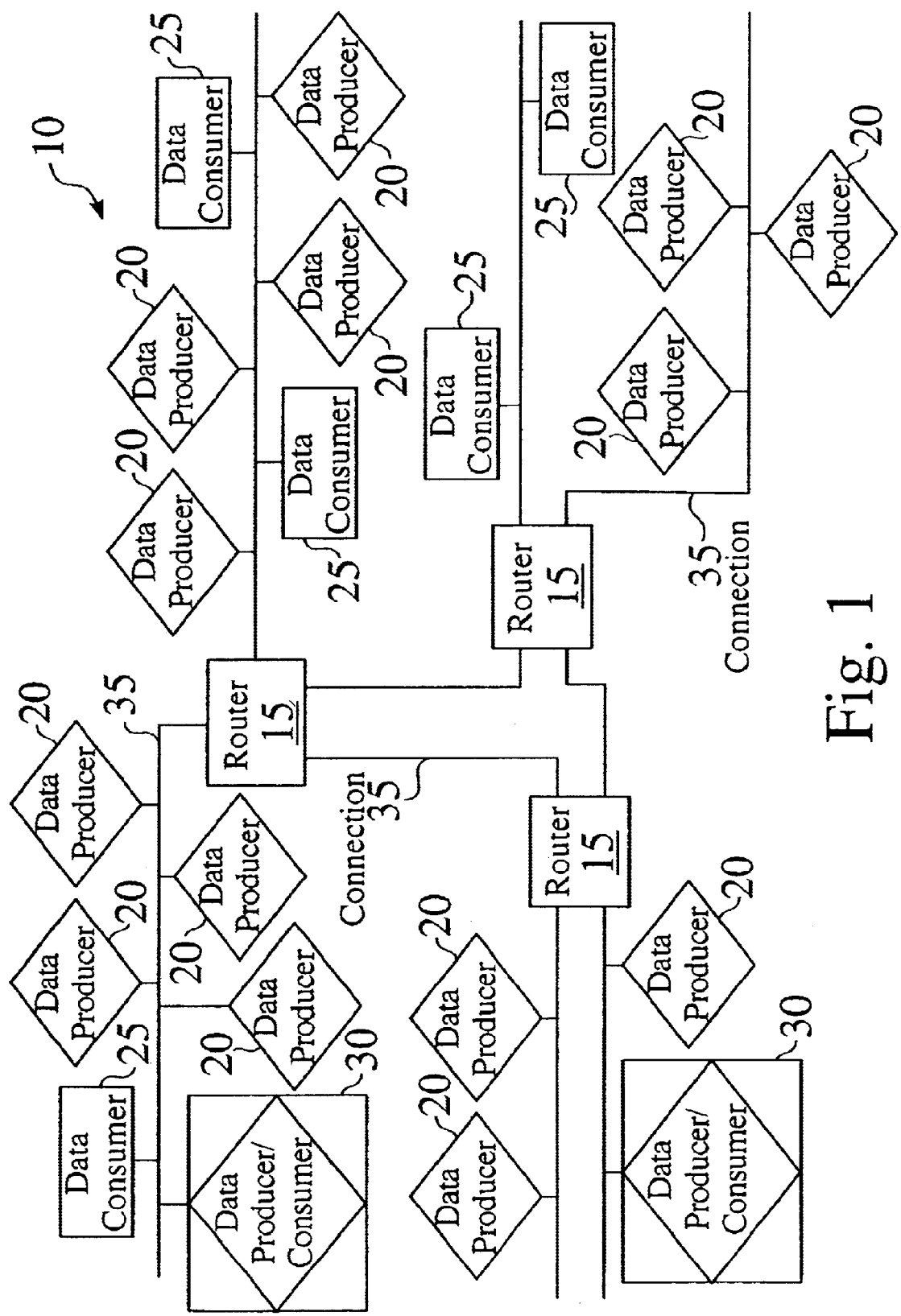
FIG. 1 shows an example of a network architecture in which the present invention may be employed.

FIG. 1 shows an example of a network architecture in which the present invention may be employed. One skilled in the art will recognize this as an internetwork 10, that is, a collection of networks connected by network routers 15, which may be interconnected to each other. The term router is used herein in a general sense and may include traditional routers, network switches, gateways, bridges, or controllers bridging separate networks. The present invention may also be used on a single network, but its value is higher on an internetwork. Each network may connect an arbitrary number of nodes. The lines 35 connecting various nodes and routers in this network architecture are wired connections, in this specific embodiment. Another architecture on which the present invention may be employed is a wireless network. This differs from the network described above for FIG. 1 in that there are no direct connections between nodes, but rather data in communicated by wireless techniques to proximate nodes given the range of transmission, and possibly line of sight restrictions. Accordingly, in these specific embodiments, lines 35 can be viewed as logical connections for a wireless internetwork. Further, in embodiments where the internetwork includes a combination of wireless and wired networks, lines 35 are logical connections and wired connections respectively. Those familiar with the art will recognize that there are many algorithms for varying the transmission range and rate to make more efficient use of bandwidth and power consumption. Moreover, those familiar with the art will recognize that there are many algorithms used to connect and reconnect mobile or dynamic nodes, called ad-hoc networking. The architecture of such networks is not fixed. The present invention is compatible with any such approaches.

According to the present invention, each node on the network has a network interface and queries may originate from any data consumer node in the network. A network node may be a data producer 20, a data consumer 25, or both (a data producer/consumer 30). Examples of data producers 20 include a data source (for example, a sensor) or a data source bank (often called a distributed I/O). Examples of data consumers 25 include controllers and monitoring systems. An example of a node that is a data producer/consumer 30 is a user operator panel. For purposes of the present invention, a controller acting as the interface to the network for one or more data sources is considered a single node which is another example of a data producer/consumer 30.

Any node in the network can be equipped with the functionality of a data consumer node, a data producer node, or a data producer/consumer node by embedding the appropriate software, in accordance with the present invention, in the node. However, not all nodes in the network need to be equipped with software according to the present invention in order for the present invention to operate.

As mentioned above, each node (including each data source) on the network has a network interface, appropriate for the type of network protocol used on the network to which that node is logically connected. This network interface includes the relevant traditional network interface protocols, of which examples include but are not limited to: Ethernet, IP, TCP, UDP, Profibus, DeviceNet, and wireless protocols such as IEEE 802.11, Ricochet, GSM, CDMA, etc. These protocols enable the network interface to receive a message from the network. Additionally, the present invention provides an extension to the data consumer's network interface and to the data producer's (e.g, data source's) network interface. In particular, each nodes' network interface includes software, in addition to the typical network protocol interface, that provides the functionalities of the present invention, as will be described in more detail below. In a specific embodiment, this additional software preferably is embedded (stored in memory such as ROM) in the network interface of the node (e.g., data consumer node, data producer node, or data producer/consumer node) or in the application resident on the node (e.g., data consumer node, or data producer/consumer node).

The present invention provides for a description of the network of data sources in terms of a traditional database schema. With this database schema, the nodes on a network view the data sources (e.g., data producer 20 or data producer/consumer 30) on the network as a "database." Traditionally, in a relational database, a schema is understood to mean tables, each of which has columns (each column corresponding to attributes of relations) and rows (each row corresponding to a relation grouping called a tuple). In an object-oriented database, a schema is traditionally understood to mean a set of object classes, which may form a hierarchy from general to specific. Either a relational or object-oriented philosophy with a schema may be followed within the framework of the present invention.

To view a network of data sources as a relational database, a table is made in the schema for each data source type. The attributes of this table include (1) each of the output types which the data source can provide, (2) attributes for descriptive information about the data source (e.g. the ID of a component which it is connected to, ID of the subsystem to which it belongs, etc.) and (3) an ID. This last ID is unique within the table for each data source in the listed in the table. If some data source types are similar but slightly different, they may be merged into a single table with extra attributes to distinguish between the types.

To view the network of data sources as an object-oriented database, an object class is defined for each data source type. One skilled in the art will recognize that if some data source types are similar but slightly different, they may be represented as subclasses of a common, more general class. Methods are included within each class to allow retrieval of the data source data, such as one method for each output type of the data source. Additional methods are included to retrieve descriptive information about the data source (e.g. the ID of a component which it is connected to, ID of the subsystem to which it belongs, etc.). Additional methods may be included to access special functions of the data source, such as reset, calibration, setting the dynamic range, etc.

As mentioned above, the present invention may view the network of data sources with a schema from either a relational or object-oriented philosophy. For clarity in understanding the invention, the following description will be describe the invention from a relational database philosophy, in accordance with a specific embodiment. It is understood that other specific embodiments of the present invention from an object-oriented philosophy are also within the scope of the present invention. Further, some databases have a schema using a combination of relational and object-oriented philosophies, and these types of databases also are within the scope of the invention.

It is an aspect of the present invention that the database schema need not be explicitly stored at any node. Each querying node need only know the table and attribute names of the data that it requires, and not the entire schema. The schema of the database is implicit from the behavior of the system, as is further described below.

Figure 2:
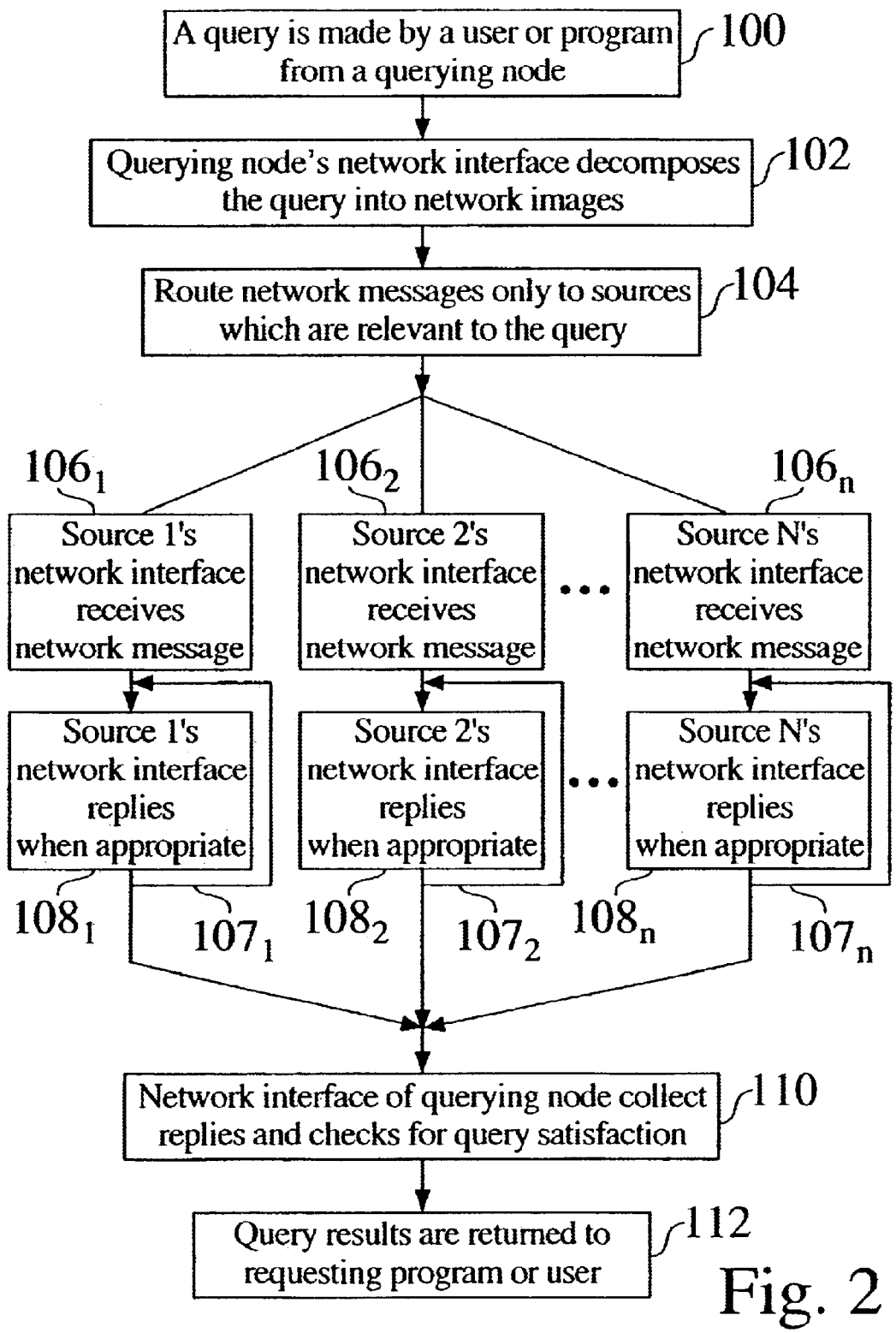
FIG. 2 shows a general functional description of a specific embodiment of the invention.

Once a schema has been designed, the present invention generally operates according to FIG. 2. Each of these steps is described in more detail later in this document. Any data consumer node 25 or 30 in the network may issue a traditional database query in a step 100. According to a specific embodiment, queries may specify a "refresh rate" which indicates that the query is to persist and be continually evaluated against the current network status at a given rate. In a step 102, that query is decomposed into the relevant parts for each data source type by the network interface of the querying node into network messages. Each network message is then routed over the network only to the data sources of the appropriate type by the routing system, in a step 104. In some cases, the network routers 15 may also route the network messages based on constraints from the query in addition to based on data source types. In a step 106, the network messages are received by each of the appropriate data sources' network interfaces. Each data source's network interface checks the constraints of the query periodically according to the refresh rate of the query, as indicated by a feedback line 107. When the constraints are satisfied, the data source's network interface replies to the query, in a step 108, and the reply is routed back to the querying node. In a step 110, the network interface of the querying node collects the replies and continually checks them for query satisfaction. Each time the query is satisfied, the network interface passes the relevant data to the querying program or user in a step 112.

Querying Node Translating Query into Network Messages

As mentioned above, the present invention provides a system to convert traditional database queries into network messages that are appropriate for a network of data sources in which each data source is viewed as a database record (relational model) or object instance (object-oriented model) or some combination thereof, and in which the schema described above is used. This system extracts the relevant parts of the query for each data source, so that it may be sent to the data source. In particular, each data consuming node 25 or 30 includes either in its network interface or in the application program resident on that data consuming node the necessary software/firmware that converts traditional database queries into network messages containing the relevant parts of the query to be sent to the appropriate data producing node 20 or 30. This network messaging software includes the functionality of extracting the relevant parts of the query and then including these parts into a message encapsulated in the data payload of a typical network protocol packet (e.g., within an Ethernet packet payload, etc.) transmitted over the network.

The present invention moreover extends traditional database queries with an optional additional specification, in accordance with a specific embodiment. Queries may specify a "refresh rate" which indicates that the query should be continuous and should be updated at the rate given. Note that even if a refresh rate is given, queries are only answered when the query constraints are satisfied, as is described in detail later.

In accordance to a specific embodiment, the relevant parts of the query for each data source are: (1) a list of constraints, possibly empty, based on which the data source should decide to send information, (2) a list of return values which the data source should return if the constraints are satisfied, (3) optionally, a refresh rate at which the data source should reconsider sending the information, (4) a unique message ID, and (5) the address of the querying node. The address of the querying node may be omitted if it is automatically provided as part of the underlying network service. These parts form a network message for each data source involved in the query. The exact structure (e.g., order and/or size of the fields containing the above relevant parts of the query) of the network message, although it should be predetermined in the system, is not crucial to the invention. The network message may be sent using one network protocol packet, or the network message may be broken into segments that are sent using multiple network protocol packets.

Figure 3:
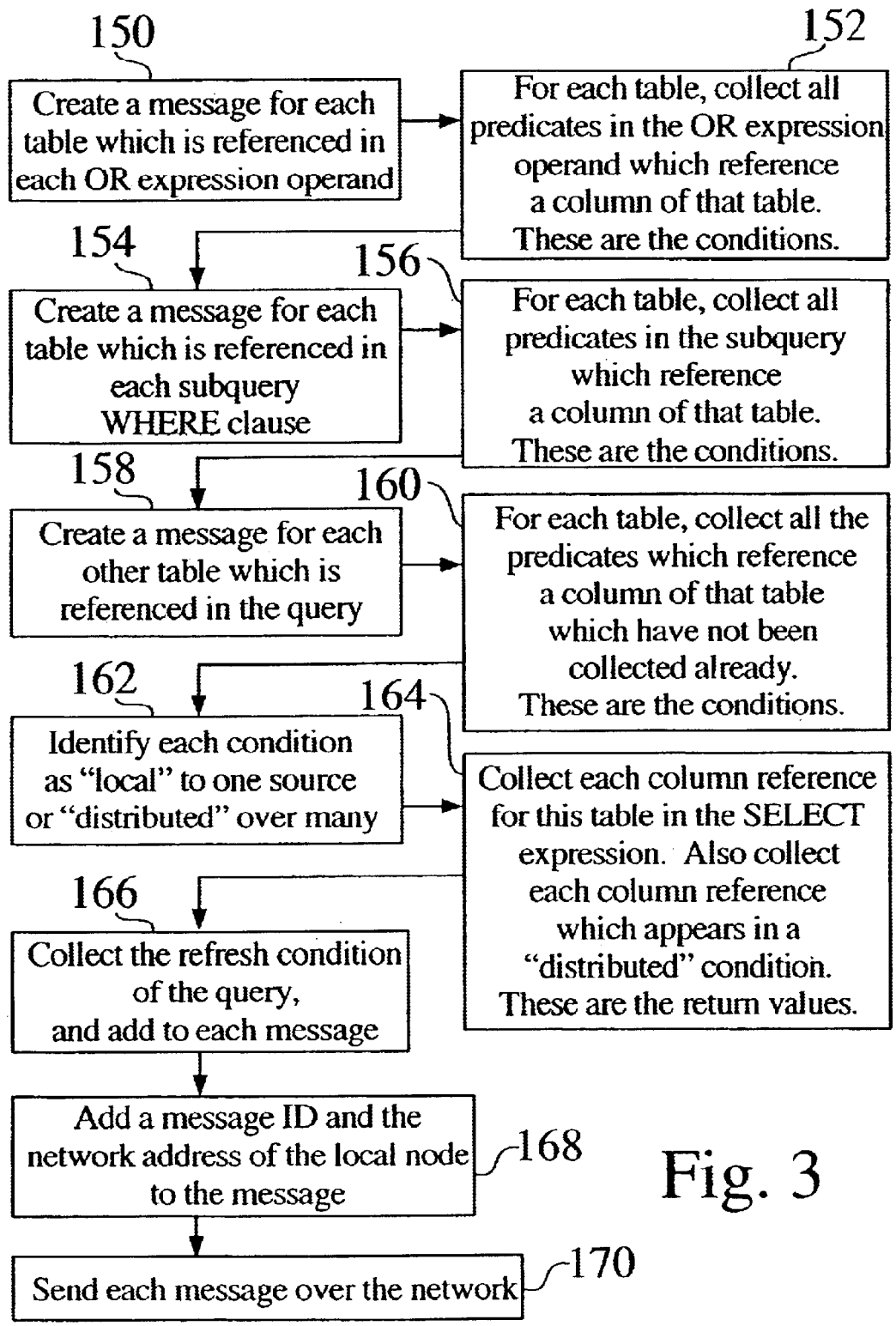
FIG. 3 shows a functional description for translating a database query into network messages, in accordance with specific embodiments of the invention.

FIG. 3 describes a system for decomposing SQL queries into the network messages described above, in accordance with a specific embodiment. The present invention is not limited to SQL as the query language. SQL is practically the standard query language for relational databases and is also being used increasingly with object-oriented databases. As the leading database query language at this time, SQL serves as an appropriate illustration of the decomposing technique of the present invention. Also, as mentioned above and emphasized herein, this description of decomposing traditional database queries into network messages in accordance to a specific embodiment of the invention is described in the context of relational database approach, but should not be so limited. The specification of constraint predicates is a significant portion of most query languages, and extracting the predicates based on relational tables referenced (or referenced classes, in an object-oriented case) can be performed for these other query languages in accordance with the present invention. Most other query languages also allow OR expressions or subqueries, and they are handled similarly as described below for SQL.

As shown in FIG. 3, in accordance with a specific embodiment of the present invention, the system for converting the traditional database query into network messages that are sent by the querying node over the network begins by creating the necessary messages.

In a step 150, one message is created for each table which is referenced within each operand of an OR expression, in the WHERE clause of the query or any subquery expression. Within the operand of the OR expression, each predicate that refers to a column of the table is included in the message as a constraint, in a step 152. Next, a message is created for each table which is referenced outside an OR expression, but which is within the WHERE clause of a subquery expression, in a step 154. All references to columns of that table which are within the WHERE clause of the subquery, but not already included in other messages, are then included in the new message as constraints, in a step 156. Next, a message is created for each table that is referenced in the WHERE clause outside any OR expression and outside a subquery expression, in a step 158. All predicates that reference columns of this table, but have not yet been included in other messages, are then included as constraints in this message, in a step 160.

In a step 162, for each constraint in each message, this constraint is identified as either "local" to one data source or "distributed" over many data sources. This is achieved by counting the number of tables which are referenced in the constraint. If it is 1, then the constraint is "local." If it is 2 or more, than the constraint is "distributed."

For each message, in a step 164, the system collects all of the columns in the SELECT expression which reference the table for which the message has been created, and adds to this list each column that references this table and occurs in a "distributed" constraint of the message. This list is added to the message as the "return values" for the message. The "distributed" constraints are then removed from the message's constraint list.

Next, for each message, if a refresh rate was specified in the query, the refresh rate is included in the message, in a step 166. Then, the system includes a unique message ID and the network address of the local querying node to the message, in a step 168. The system then sends each message over the network in a step 170.

Therefore, a simple exemplary query (such as for a factory automation environment where the location of those containers meeting certain requirements are requested to be selected) that is in the form of SELECT location from container:

WHERE (predicate1)

where predicate1 could be "Temp>100 degrees", would be sent translated into a network message with predicate1 with a unique message ID and the network address of the querying node. Another exemplary query in the form of:

WHERE (predicate1 AND predicate2)

where predicate2 could be "Pressure >100 psi", would be sent translated into a network message with predicate1 and another network message with predicate2, with both network messages having the same message ID and the network address of the querying node. Yet another exemplary query in the form of:

WHERE (predicate1 OR predicate3)

where predicate3 could be "Volume <250 cubic cm", would be sent translated into a network message with predicate 1 and another network message with predicate3, with both network messages having the same message ID and the network address of the querying node.

Routing Over Network of Network Messages

Once a query has been converted into a collection of data source-relevant network messages, these messages must be sent to the data sources for satisfaction. In order to achieve this without requiring a central database of the data source addresses, the network routers need to understand how to route messages based on the data source type referenced in the message. A type-based message routing method is needed so that network messages are routed only to those data source types which are relevant to the particular query made.

The preferred technique for implementing type-based message routing in specific embodiments of the invention is characteristic,routing, as described in detail in commonly-owned US patent application Ser. No. 09/728,580 entitled "Characteristic Routing," filed concurrently herewith, and incorporated herein by reference. Characteristic routing is a routing protocol that allows data to be transported multi-hop through a network from a sender node to a set of nodes using an arbitrary mix of "characteristics" (characteristics are descriptions of the nodes in the form of multiple arbitrary identifying descriptive names). Nodes can have multiple, dynamic characteristics. Characteristic routing is optimized to make routing using multiple characteristics fast and efficient by creating a routing table index using bit vectors and compression techniques. Using characteristic routing as the index for the networked objects (e.g., data sources) being queried provides an efficient indexing means for fast and efficient information retrieval from a distributed network of data sources database. In particular, characteristic routing eliminates the need to individually contact data sources or to create predefined multicast groups in order to query the data sources relevant to a query. Characteristic routing, which provides a bit vector representing the particular characteristics for each node, where each bit location in the bit vector represents the existence of a particular characteristic out of a set of total characteristics for a node. Network messages sent using characteristic routing can be directed to data sources that have the information requested in the query.

An alternative, although less efficient, is to use Internet Protocol multicast (IP-multicast) for message routing, and to assign each data source type to be a particular multicast group. The advantages of characteristic routing relative to IP-multicast routing are described in more detail in the above-referenced patent application.

Routers 15 in the network will be equipped appropriately to perform the particular type-based message routing that might be utilized in specific embodiments. Accordingly, the network messages are routed only to those data producers 20 or 30 which meet the defined type relevant to the query.

Network Interface Response to Network Messages

Figure 4:
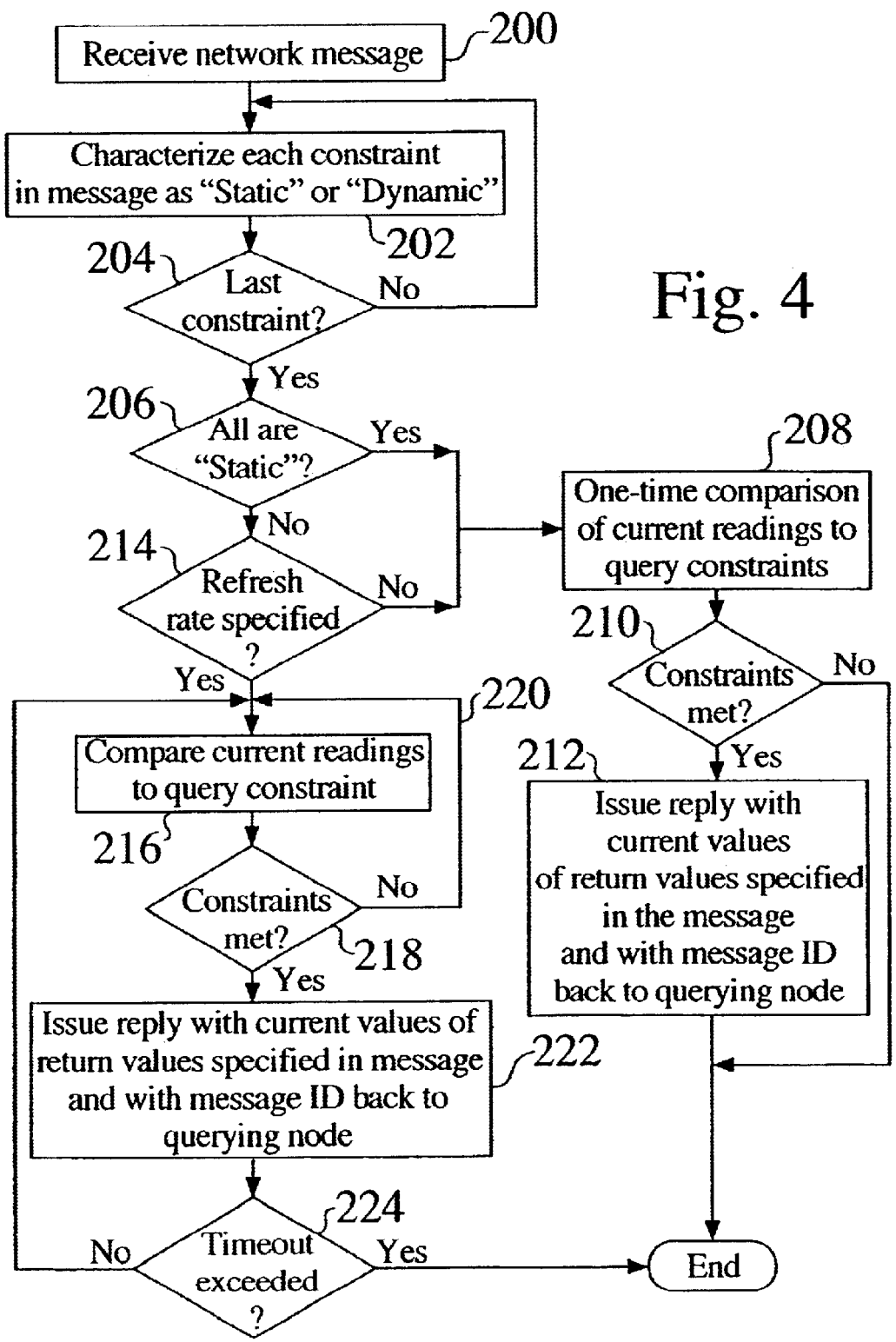
FIG. 4 shows a functional description of a network interface processing network messages received, in accordance with a specific embodiment of the invention.

The present invention also extends the functionality of each data source's network interface so that the data source can respond to network messages appropriately, as discussed in the following with regard to FIG. 4. In particular, each data producing node 20 or 30 includes either in its network interface or in the application program resident on that node the necessary software/firmware that processes received network messages and transmits response messages back to the appropriate querying node when the query constraints are met. The response messages are encapsulated in the data payload of a typical network protocol packet (e.g., within an Ethernet packet payload, etc.) that is transmitted by the data producing node 20 or 30 over the network.As seen in FIG. 4, when a message of the form described above is received in a step 200 by a data source that meets the defined type relevant to the query, the data source's network interface adds the message to its list of outstanding queries (for example in a buffer).

For each network message in the list of outstanding queries, the data source's network interface characterizes each constraint in the message as either "static" or "dynamic," in a step 202. This characterization is achieved by considering all of the column references in the constraint. If all of the column references are for "descriptive" attributes, then the constraint is considered "static." Otherwise, the constraint is considered "dynamic." The network interface determines in a step 204 if the previously-characterized constraint is lo the last constraint in that message. If not, then the system returns to step 202 to characterize the next constraint in the message.

Once the last constraint in the message is characterized, the data source's network interface determines in a step 206 whether all the constraints in the message are "static." If all the constraints in the message are determined to be "static," then the network interface in a step 208 performs a one-time comparison of the current readings of the data source to the query constraints. If the current readings meet the query constraints, as determined in a step 210, then the network interface issues back to the querying node a reply message that includes: the current values of the return values specified in the processed network message, an indication that the constraints were "static," and the unique message ID of the processed network message. The reply message, which includes the address of the replying node and is addressed to the querying node, gets transmitted by the data source's network interface over the network for routing back to the querying node.

If the determination is made in step 206 that not all constraints were "static," but rather included at least one "dynamic" constraint, then the system determines in a step 214 whether a refresh rate was specified in the network message. If a refresh rate is not specified, then the network interface proceeds to step 208 and performs a one-time comparison of the data source's current readings to the query constraints. The system then executes the remaining steps 210 and 212, in a similar manner as already described above.

If the determination is made in steps 206 and 214 that the message included at least one "dynamic" constraint and a refresh rate was specified in the network message, then the network interface compares the current data source readings to the query constraints in a step 216. If the constraints are determined in a step 218 not to be met, then the network interface returns (as indicated by line 220) at the specified refresh rate to step 216 to compare the current data source readings to the query constraints. If the constraints are determined in step 218 to be met, then the network interface in a step 222 issues back to the querying node a reply message that includes: the current values of the return values specified in the processed network message, and the unique message ID of the processed network message. The reply message, which is addressed to the querying node, gets transmitted by the data source's network interface over the network for routing back to the querying node. If the value of a predetermined lifetime parameter that optionally may be specified in the network message has been exceeded, as determined in a step 224, then the network interface ends its processing of the message. However, if this value has been determined in step 224 not to be exceeded, then the network interface returns to step 216 to make another comparison at the specified refresh rate. The system then continues on from step 216, as already described above.

Reply Message Processing and Query Result Production at Querying Node

FIGS. 5A–5C describe the functionality of the present invention for collecting reply messages and producing the query results at the querying node. The system, which can be software running in a client application resident on the querying node or embedded in memory in the network interface of the querying node, has three logical threads, which may be implemented as actual separate threads or as a single monolithic process.

As seen in FIG. 5A, the first thread is responsible for collecting the reply messages from the network. In particular, each reply message is received from the network in a step 300. Each reply message is then placed into the appropriate buffer in a step 302. Separate buffers, indexed by the different message IDs, are maintained for each of the original network messages (each having its own message ID) sent by the querying node. Based on the message ID stored in the reply message, the reply is added to the relevant buffer. A timestamp is added to the reply message to indicate the time at which it was received. Note that multiple queries may originate from the same node, so this thread accepts reply messages relevant to different queries from this node.

The purpose of the second thread shown in FIG. 5B is to enforce the timing constraints of the system. This thread includes a timing interval, called ReplyLifetime, after which any reply message is to be removed from its buffer. The value of the ReplyLifetime is to be determined on a case-by-case basis, but a reasonable default value can be three times the refresh rate of the relevant query. This thread continuously checks though all of the buffers looking for any reply message which was received at a time greater than ReplyLifetime units ago. If any such message is found, it is deleted from the buffer, unless it is marked as "static" in which case it is unchanged. In particular, for each buffer, each reply message is scanned in a step 330. A determination whether a reply message is marked "static" is made in step 332. If the reply message is not "static," then the system continues on to scan the next reply message in step 330. If the reply message is marked "static," then a determination is made whether the message timestamp is older than the ReplyLifetime value in a step 334. If not, then the system continues to scan the next reply message in the buffer in step 330. However, if the timestamp message is older than the ReplyLifetime value, then that reply message is removed from that buffer. Accordingly, those reply messages that are marked "static" and are older than some predetermined time that exceeds a desired threshold are deleted.

The third thread, as illustrated in FIG. 5C, continuously evaluates all of the queries that have been issued from this querying node. It uses the reply messages in each buffer to check for the satisfaction of query constraints that involve data from more than one data source. In database terminology, these predicates are called "joins." For example, if a query included a predicate such as "A.PartID= B.PartID", where A and B are data source types, this condition would be evaluated by this thread whenever reply messages to network messages including this constraint were received. Whenever a set of reply messages exists within the buffers which completely satisfies a specific query, then the values corresponding to the SELECT clause of the query are returned to the program or user which issued the query. The values returned are the query result.

Ending Refreshing Queries

In accordance with a specific embodiment, queries for which a refresh rate has been specified continue until terminated. Any node may terminate a query by sending a special "terminate_query" message to each data source meeting the data source-type referenced in the query. This termination message includes the message IDs of the network messages to be terminated. The data source's network interface then removes the network message from its list of outstanding queries. Optionally, as was discussed earlier, a lifetime may be assigned to a query, so that the network interface of each data source will automatically delete any network messages after their lifetime has elapsed.

At the time that a query is terminated, the querying node also erases any reply messages relating to that query which are still in its buffers. The reply messages to be erased would also include any reply messages marked as "static."

Designated Join Nodes

Databases provide the ability to cross-reference information (i.e., perform "joins"). The embodiments described above primarily discuss the processing, including joining, of returned information sent in the various reply messages at the querying node. However, in other specific embodiments, the processing of returned information can be performed as the information returns through the network through progressive joins, or the task of performing joins can be delegated to specific nodes, called designated joiners, which lie along the upstream path from the queried data producing nodes to the querying node and which possess greater computational ability or memory than the data producing nodes. Designated join nodes perform computations in a distributed manner on returning information in reply messages as they arrive at the designated join nodes. In addition to performing joins, designated join nodes can perform averages, etc. With embodiments using progressive joins or designated joiners, the processing reply messages at the querying node will be reduced or simplified, as much of the processing will have occurred such that the returned information sent to the querying node has been previously processed. Designated join nodes are particularly useful when the system uses a mix of lower-cost, lower-functionality data sources (i.e., data producing nodes) and higher-cost, higher-functionality active components (e.g., data producing/consuming nodes, or data producing nodes with higher processing power and/or more memory). This mix of devices can occur, for example, when upgrading an existing network of data sources or when overall system cost savings are desired.

The description above illustrates various specific embodiments, and it is understood that the present invention is not necessarily limited to the described embodiments. Variations or modifications of the described embodiments could be made without departing from the scope of the invention, which is to be limited only by the issued claims.

What is claimed is:

1. A method for information management of a distributed data sources network database that comprises a plurality of nodes, said plurality of nodes including a guerying node and a plurality of data sources, said method comprising the step of:

providing a schema for said distributed data sources network database;

entering a Query in a database language at said querying node in said network;

decomposing said query into at least one network message, wherein said decomposing step comprises collecting at least one constraint and at least one return value from said query, creating said network message comprising said constraint and said return value in said query, and adding a message ID and the network address of said querying node to said constraint and said return value to form said network message;

transmitting said network message to data sources relevant to said query;

receiving said network message at said data sources relevant to said query;

sending a reply message to said network message when said query is met; and providing a query result in said database language at said guerying node from said reply message.

2. The method according to claim 1, wherein said network message is an Ethernet packet, IP packet, TCP packet, UDP packet, Profibus packet, DeviceNet packet, IEEE 802.11 packet, Ricochet packet, GSM formatted packet, or CDMA formatted packet, or multiple of said packets.

3. The method according to claim 1, wherein said schema comprises a relational schema, an object-oriented schema, or an object-relational schema.

4. The method according to claim 3, wherein said query language comprises SQL.

5. The method according to claim 1, wherein said transmitting step comprises routing said network message to data sources relevant to said query by using characteristic routing.

6. The method according to claim 1, wherein said transmitting step comprises routing said network message only to data sources relevant to said query by using multicast routing.

7. The method according to claim 1, wherein said decomposing step comprises collecting all predicates from said query, said predicates referencing columns of a table, creating network messages for all said predicates, wherein each network message comprises at least one predicate in said query, and adding a message ID and the network address of said querying node to said network messages.

8. The method according to claim 7, wherein the predicates incorporated into each said message are chosen based on the tables referenced.

9. The method according to claim 7, wherein the predicates incorporated into each said message are chosen based on classes referenced.

10. The method according to claim 7, wherein the predicates incorporated into each said message are chosen based on their position within OR expressions and subqueries.

11. The method according to claim 1, further comprising the step of:

comparing current readings to a constraint received in said network message at said data sources relevant to said query; and wherein said replying step comprises encapsulating current values of said return values specified in said network message, and adding said message ID and said network address of said querying node to said reply message.

12. The method according to claim 11, wherein said reply message is an Ethernet packet, IP packet, TCP packet, UDP packet, Profibus packet, DeviceNet packet, IEEE 802.11 packet, Ricochet packet, GSM formatted packet, or CDMA formatted packet, or multiple of said packet.

13. The method according to claim 1, wherein said constraint is static or dynamic.

14. The method according to claim 1, wherein said decomposing step comprises collecting all predicates from said query, said predicates referencing classes, creating network messages for all said predicates, wherein each network message comprises at least one predicate in said query, and adding a message ID and the network address of said querying node to said network messages.

15. The method according to claim 1, wherein said data sources comprise sensor nodes.

16. The method according to claim 1, wherein said plurality of nodes also includes a routing node, and wherein said network message is routed by said routing node using a type-based message routing to determined data sources relevant to said query in said transmitting step.

17. A system for information management of a distributed network of data sources database, said system comprising:

a network;

a plurality of data sources coupled to said network, said data sources capable of providing information according to a schema for said distributed network of data sources database;

at least one querying node coupled to said network, said querying node capable of receiving a query in a database language and decomposing said query into at least one network message that is transmitted over said network to data sources relevant to said query, wherein said network message is transmitted using characteristic routing over said network only to data sources relevant to said query;

wherein data sources relevant to said query send a reply message over said network in response to said network message when said query is met, and said querying node provides a query result in said database language from said reply message.

18. The system according to claim 17, wherein said network message and said reply message are Ethernet packets, IP packets, TCP packets, UDP packets, Profibus packets, DeviceNet packets, IEEE 802.11 packets, Ricochet packets, GSM formatted packets, or CDMA formatted packets, or multiple of said packets.

19. The system according to claim 17, wherein said schema comprises a relational schema, an object-oriented schema, or an object-relational schema.

20. The system according to claim 17, wherein said query language comprises SQL.

21. The system according to claim 20, wherein said network message is transmitted using multicast routing over said network only to data sources relevant to said query.

22. The system according to claim 17, wherein said data sources relevant to said query compare current readings to a constraint received in said network message, and send said reply message comprising current values of return values specified in said network message, a message ID and a network address of said querying node.

23. The system according to claim 17, further comprising:
a designated joiner node coupled to said network, wherein said designated joiner node located between said querying node and said data sources relevant to said query, and wherein said designated joiner node receives and processes at least two reply messages from said data sources relevant to said query to produce and send a reply message containing joined information from said at least two reply messages; and
wherein said querying node provides said query result in said database language from said reply message containing said joined information.

24. The system according to claim 17, wherein said data sources comprise sensor node.

25. The system according to claim 17, wherein said system also includes a routing node coupled to said network, and wherein said at least one network message is routed by said routing node using a type-based message routing to determine data sources relevant to said query.

26. A computer-readable program product comprising:
computer-readable code stored on computer-readable storage medium;
wherein said computer-readable code is capable of receiving a query in a database language, decomposing said query into at least one network message that is transmitted over a network only to data sources relevant to said query, wherein said network message is transmitted using characteristic routing over said network only to data sources relevant to said query, receiving a reply message over said network in response to said network message when said query is met, and providing a query result in said database language from said reply message.

27. The computer-readable program product according to claim 26, wherein said network message is an Ethernet packet, IP packet, TCP packet, UDP packet, Profibus packet, DeviceNet packet, IEEE 802.11 packet, Ricochet packet, GSM formatted packet, or CDMA formatted packet, or multiple of said packets.

28. The computer-readable program product according to claim 27, wherein said network message that is transmitted using characteristic routing or multicast routing over a network only to data sources relevant to said query.

29. The computer-readable program product according to claim 27, wherein said computer-readable storage medium stores thereon a computer application program resident on a querying node.

30. The computer-readable program product according to claim 27, wherein said computer-readable code is loadable into memory resident on a network interface of a querying node.

31. The computer-readable program product according to claim 26 wherein said data sources comprise sensor nodes.

32. The computer-readable program product according to claim 26, wherein said at least one network message is routed by a routing node using a type-based message routing to determine data sources relevant to said query.

33. A computer-readable program product comprising:
computer-readable code stored on computer-readable storage medium;
wherein said computer-readable code is capable of receiving a network message comprising a decomposed query including a constraint and a return value, comparing a current value for said return value, sending a reply message over a network in response to said network message when said constraint from said decomposed query is met, wherein said network message is transmitted using characteristic routing over said network only to data sources relevant to said query.

34. The computer-readable program product according to claim 33, wherein said computer-readable code is loadable into memory resident on a network interface of a data source.

35. The computer-readable program product according to claim 34 wherein said data source comprises a sensor node.

36. The computer-readable program product according to claim 33, wherein said network message is routed by a routing node using a type-based message routing to determine data sources relevant to said decomposed query.

37. A data source comprising:
data source hardware;
a network interface including memory and a controller;
computer-readable code stored on said memory, wherein said computer-readable code is capable of receiving a network message comprising a decomposed query including a constraint and a return value, comparing a current value for said return value, sending a reply message over a network in response to said network message when said constraint from said decomposed query is met, wherein said network message is transmitted using characteristic routing over said network only to data sources relevant to said query.

38. The data source according to claim 37 wherein said network interface provides for receiving said network message and sending said reply message, said network message and said reply message being Ethernet packets, IP packets, TCP packets, UDP packets, Profibus packets, DeviceNet packets, IEEE 802.11 packets, Ricochet packets, GSM formatted packets, or CDMA formatted packets, or multiple of said packets.

39. The data source according to claim 37, wherein said data source comprises a sensor node and said data source hardware comprises a sensor node hardware.

40. The data source according to claim 37 wherein said network message is routed by a routing node using a type-based message routing to determine relevance to said decomposed query.

41. A designated join node comprising:

a network interface including memory and a controller;

computer-readable code stored on said memory, wherein said computer-readable code is capable of receiving at least two reply messages, each reply message comprising a response to network message comprising a decomposed query including a constraint and a return value, processing said reply messages to provide and send a joined reply message over a network in response to said network message when said constraint from said decomposed query is met, wherein said network message is transmitted using characteristic routing over said network only to data sources relevant to said query.

42. The designated join node according to claim 41, wherein said network message is routed by a routing node using a type-based message routing to determine data sources relevant to said decomposed query.

* * * * *